Jan. 12, 1965  F. L. WAITE  3,164,938
WRAPPING MACHINE
Filed March 16, 1962  5 Sheets-Sheet 1
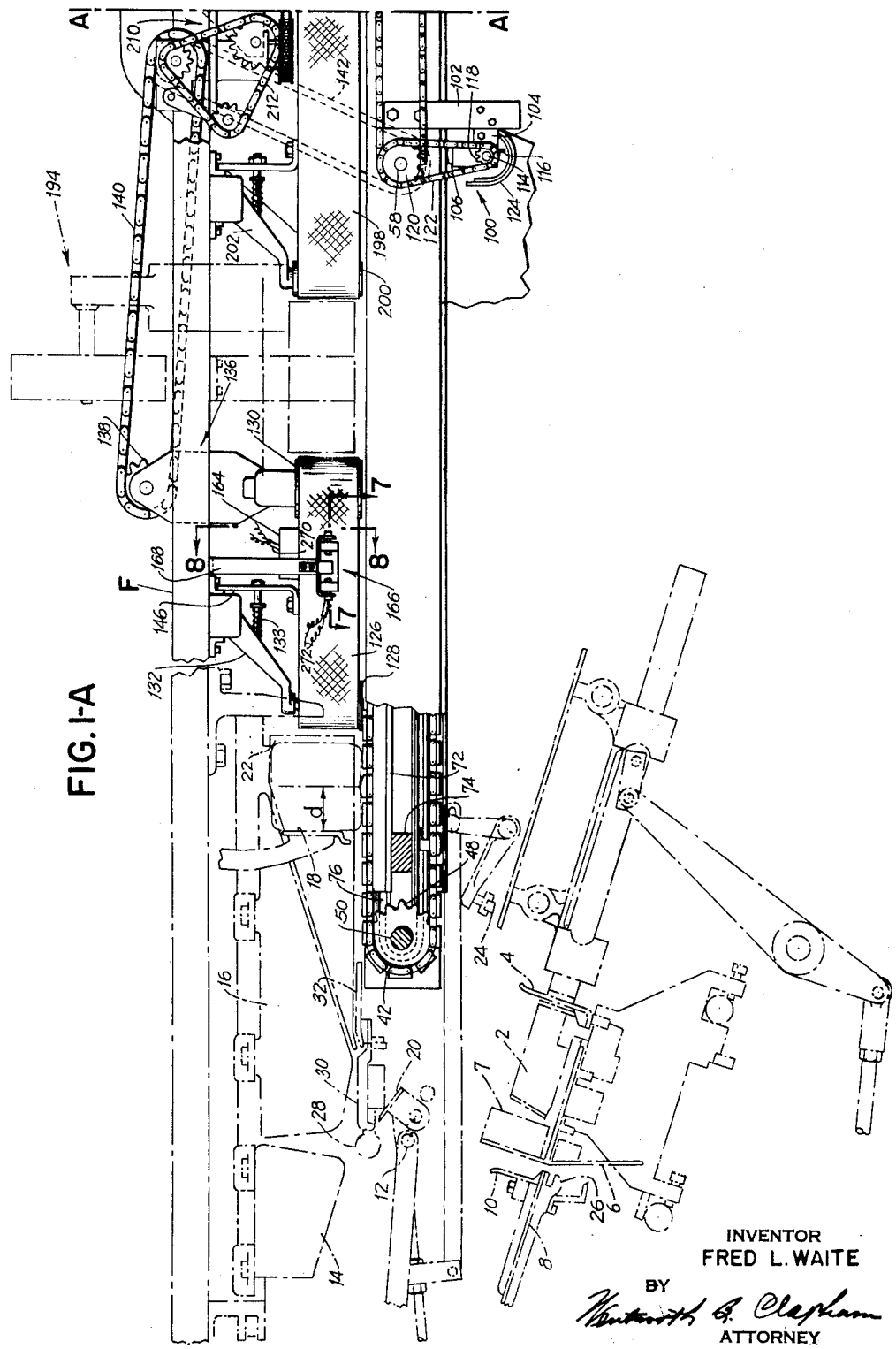
FIG. I-A
INVENTOR
FRED L. WAITE
BY
ATTORNEY Jan. 12, 1965  F. L. WAITE  3,164,938
WRAPPING MACHINE
Filed March 16, 1962  5 Sheets-Sheet 2
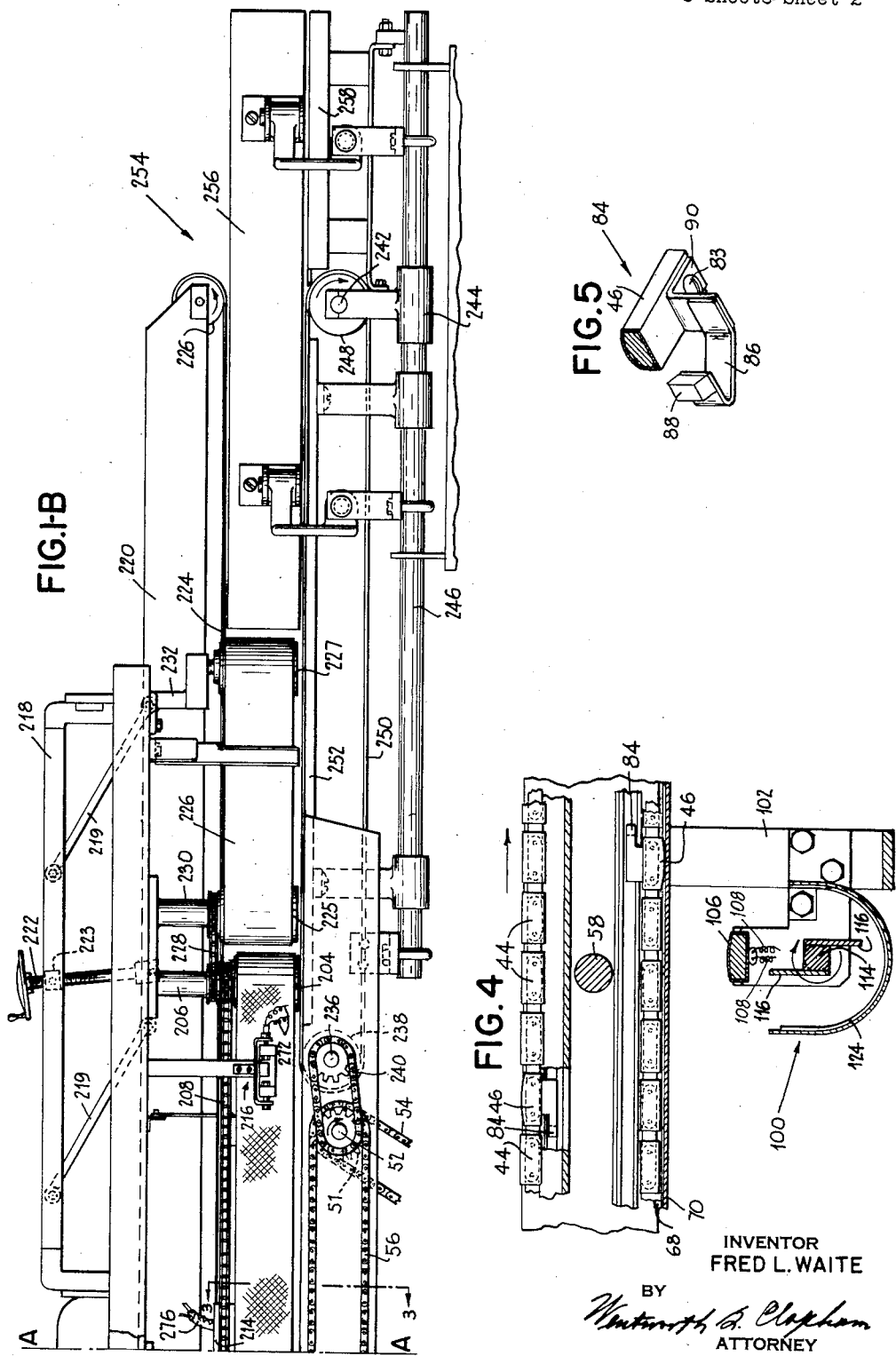
INVENTOR
FRED L. WAITE
BY
Wentworth L. Clapham
ATTORNEY Jan. 12, 1965   F. L. WAITE   3,164,938
WRAPPING MACHINE
Filed March 16, 1962   5 Sheets-Sheet 3
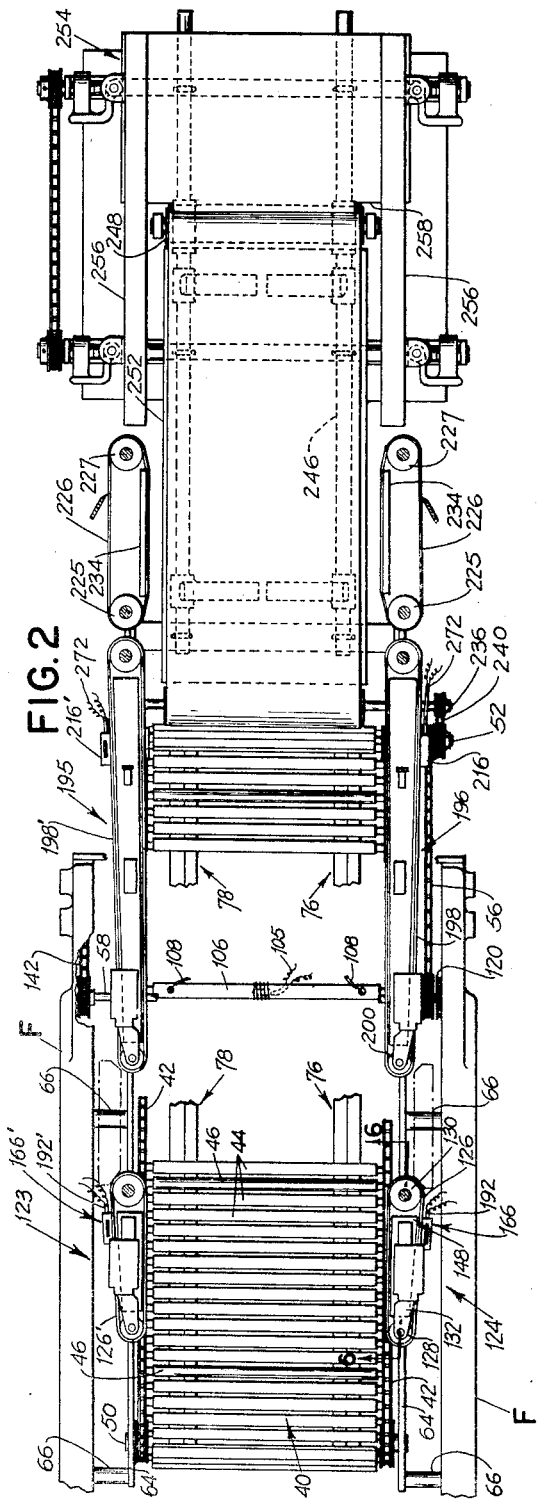
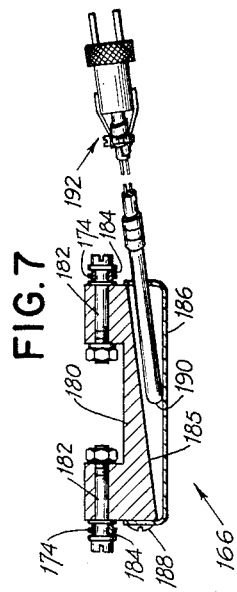
INVENTOR
FRED L. WAITE
BY
Wentworth S. Clapham
ATTORNEY Jan. 12, 1965   F. L. WAITE   3,164,938
WRAPPING MACHINE
Filed March 16, 1962   5 Sheets-Sheet 4
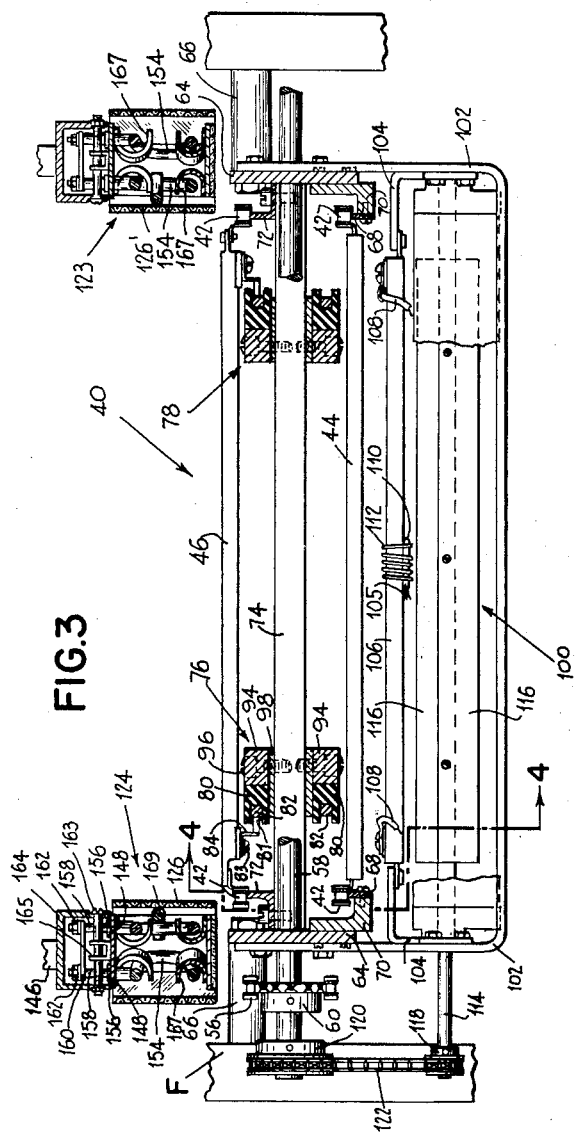
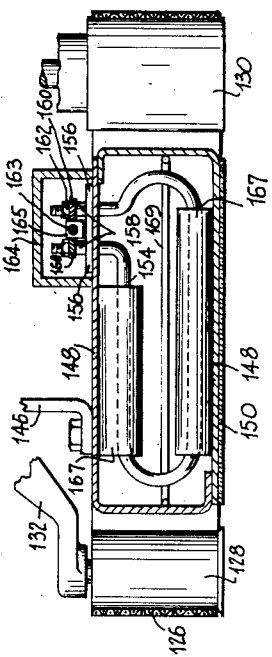
INVENTOR.
FRED L. WAITE
BY
*Wentworth L. Clapham*
ATTORNEY

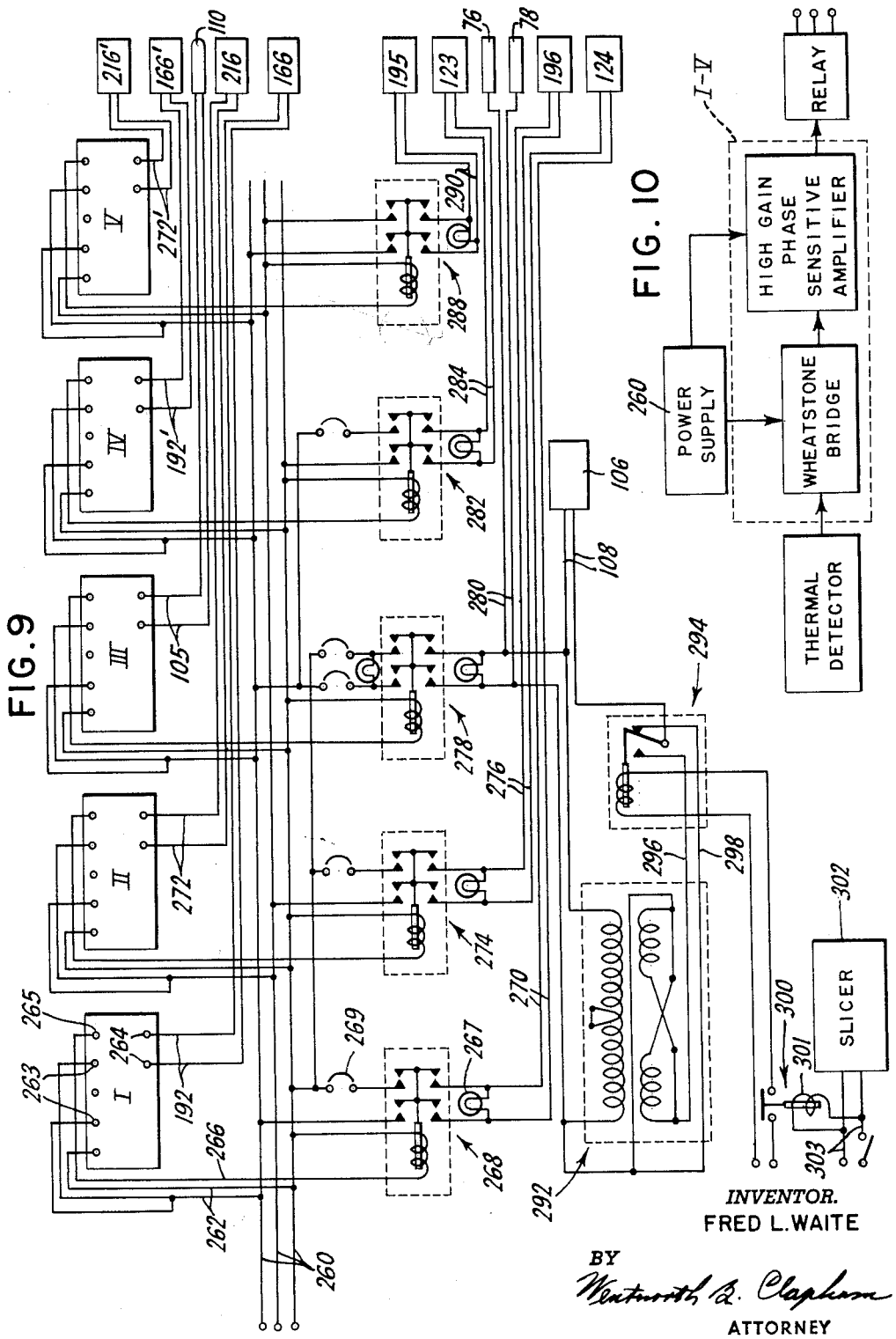

3,164,938
WRAPPING MACHINE
Fred L. Waite, East Williston, N.Y., assignor to American Machine & Foundry Company, a corporation of New Jersey
Filed Mar. 16, 1962, Ser. No. 180,219
22 Claims. (Cl. 53—379)

The present invention relates to wrapping machines having means for the heat sealing of a wrapper, and more particularly to improvements in such heat sealing means.

This application is a continuation in part of my copending application Serial No. 858,138, filed December 8, 1959, now Patent No. 3,075,326.

Although the invention will be described in its application to a particular type of wrapping machine, such as used for bread wrapping, it should be understood that the invention is equally applicable to numerous other wrapping operations. In order to provide background for problems presently to be discussed, some material by way of introduction is here appropriate. The disclosed wrapping machine is of the basic type wherein a length of heat sealable material is wrapped about an article such as a loaf of bread to form end folds and a bottom overlap which generally are secured by heating thereof. This material may be "heat sealable" by virtue of being inherently thermoplastic (such as polyethylene or polypropylene, or cellophane having a suitable coating such as wax). If desired, the heat sealing may be accompanied by the application of end labels or the like.

As disclosed in said Patent No. 3,075,326, a highly advantageous form of heat sealing apparatus comprises a conveyor having traveling heating elements which are engageable with the sealable wrapping material. Of particular significance therein is the heat sealing of the bottom overlap by means of a bottom conveyor having spaced cross bars which are heated electrically, the delivery of articles being synchronized with the movement of these bars so that as each wrapped article rests upon and moves with a heated bar it has its bottom overlapping wrapper portion sealed by thermoplastic action. As to the end folds of the package, these are sealed by heated traveling side belts of special construction. Prior to these improvements, i.e. these improvements treated in said patent, heat sealing typically was effected by moving the wrapped loaf across stationary heating plates. The use of traveling heating means, such as the heated conveyor bars, represented a marked improvement over such prior art particularly when using the more recently developed synthetic films. The reason for this is mainly that the traveling heaters apply the substantially uniform and moderate heat required for good heat sealing of these films, whereas defective closures resulted from the rapid, high temperature application of heat according to prior methods.

Proceding then to matters of more direct significance for present purposes, in machines in which certain modern synthetic films are used as wrapping materials it is of great importance that sealing temperatures be maintained within very narrow permissible ranges. Although temperature control to within 15° F., for example, may be permissible for wax paper or cellophane, when it is desired to run films such as polyethylene or polypropylene a control of temperature to within tolerances of only a few degrees usually is necessary. The application of heat at a temperature outside the allowable range generally will produce incomplete closure and/or complete melting of the wrapping material. (The application of a very high temperature typically will produce what appears to be a deterioration by melting or burning of the wrapper material, with formation of lattice-like open areas.) In practice heretofore, the adjustment of means such as a rheostat, powerstat or the like to vary the input to each electrical resistance heating element was intended to result in a desired fixed heat sealing temperature, but due to various extraneous conditions the actual temperature which resulted would deviate considerably from the desired temperature. For example, despite the fixed power setting, fluctuations in ambient conditions in a bakery can have corresponding effects on the actual temperatures of the heating elements. These changing conditions generally are attributable to changes in the operation of fans and air conditioning equipment, to drafts caused by the opening and closing of doors, and to naturally occurring temperature changes throughout the day. Turning off cold-air-conditioning equipment in close proximity to the bread wrapping machinery, for example, can cause a sharp increase in heat sealing temperature, possibly producing burning or complete melting of a synthetic film wrapping material, unless the machine operator has sufficient skill to compensate for temperature changes by manually effecting exactly the right adjustments in temperature setting.

Thus, changes in surrounding conditions can affect the heat sealing temperature, but in addition, there can occur changes in the rate of heat transfer from the heating elements to the articles themselves. The latter can be due simply to changes in the wrapping operation of the machine, i.e. the rate at which articles are fed to the machine, wrapped, and sealed by contact with the heating elements. If, for example, the delivery of bread (typically from a slicing machine) is temporarily interrupted, the decrease in heat taken from the heating elements gives rise to establishment of a temperature which will be too high for satisfactory heat sealing when the delivery of loaves is resumed. An even further factor is that, regardless of whether articles actually are being wrapped or the machine is being run idle, the rate of movement of the traveling heating elements has an effect on their temperature. That is, heat generated from a heating element through convection to the atmosphere is related to the speed at which it is traveling. It is to be noted that the above-discussed conditions affecting heat sealing temperature have not been accounted for in the prior art, the only possible control over temperature having been, as mentioned previously, in the nature of a fixed manual setting for any desired temperature. Therefore, a machine needs constant attention by a skilled and experienced operator who must observe the closures being produced and manually effect any necessary changes in the setting of a temperature-controlling rheostat, powerstat or the like.

A principal aspect of the present invention involves broadly the automatic regulation of the temperatures of the various traveling heating elements in response to a system for sensing either directly or indirectly what the actual temperatures of these elements are. Due, however, to the mechanics involved in the provision of spaced multiple heater bars on a traveling conveyor, certain complicated problems arise in the sensing of their temperature. As disclosed herein and in said copending application, electrical energy is conducted to the heater bars of the endless conveyor by means of a commutator arrangement in which brushes associated with each heater bar ride in sliding contact with energized stationary rails. To employ conventional electrical measuring elements such as thermistors or thermocouples to sense directly the respective temperatures of these moving elements would be unfeasible, for as is well known in engineering circles it is very difficult, if not impossible, to obtain accurate measurements from electrical signals transmitted through sliding contacts. As will become more evident hereafter, the invention completely avoids such complex problems of direct sensing, but, in a rather indirect approach to temperature sensing, nevertheless affords excellent control.

Accordingly, one of the main objects of the invention is to overcome the problems discussed above. In short, it is an object to achieve completely automatic temperature control of traveling heating elements, including automatic compensating adjustment for the aforementioned changing conditions to which the heat sealing system is subjected.

Briefly, this object is attained by continuously sensing, directly or otherwise, the surface temperatures of the heat sealing elements, these being in the specifically illustrated case the bottom conveyor and the traveling side belts, and in response to signals providing a measurement of such temperatures effecting whatever adjustments are necessary to maintain the desired heat sealing temperatures. For sensing the temperatures of each heated side belt, which heat seals a set of end folds in the wrapping, there is provided a specially constructed and highly effective thermal detector assembly that rides on the belt and produces responses in a control circuit in accordance with the temperature which it directly senses.

For reasons already explained it is not feasible to directly and individually sense the temperatures of the multiple heated bars forming part of the bottom conveyor. Instead, according to the invention I provide a stationary "master" heater bar, identical to the traveling heater bars, sense its temperature with a conventional thermal detector, and in response thereto automatically effect any adjustments necessary to maintain a constant heat sealing temperature. This master heating element is located close to the path of travel of the conveyor, whereby similar ambient conditions prevail. In order to take into account the variable rate of movement of the conveyor, a flow of air across the master heater is induced by fanning means driven at a speed proportional to that of the conveyor and empirically developed to simulate the relative movement of air across the traveling heater bars. Finally, in order to prevent an increase in the temperature of conveyor heater bars when the wrapping machine is being run idle, certain compensating adjustments in the electrical circuit are automatically effected. With respect to the master heater bar arrangement, as will become more evident hereafter, this constitutes in essence a mechanical analog of a traveling heater bar and of the conditions affecting its temperature, with this simulating analog system being the basis for responsive thermostatic control.

Certain features in construction of the traveling side belt heaters are closely tied to problems of effective temperature control. In prior machines of the subject type, heat was transferred to each belt by a relatively heavy heating plate mounted for sliding contact with the inside of the belt. Due to the substantial mass of such a plate, and its resultant heat storage capacity, desired temperature changes thereof in response to adjustments in power input cannot take place as quickly as desired. This difficulty is overcome, however, in a novel side belt assembly incorporating lightweight radiant heating elements, whereby desired temperature changes are effected more quickly than when a large heat conducting mass is employed.

In connection with the matter of heated side belt assemblies, a further object of the invention is to achieve more uniform heat sealing contact between the belts and the respective ends of the loaves. Heretofore the stationary or moving heating elements for sealing the end folds have had vertically fixed front surfaces. On the other hand, the end of a loaf is not always squared with its bottom, and therefore uniform contact between the vertical heating element surfaces and the loaf ends over large areas is not possible in such cases. In contrast, according to the invention the side belts are supported in such manner that they movably adjust and conform to the angularity of the loaf end, whereby the desired uniformity of heat sealing contact is established.

Further objects and advantages of the invention will become evident from the following description, read in conjunction with the accompanying drawings in which:

FIGURES 1–A and 1–B together constitute an elevation view of a bread wrapping machine embodying the invention, these figures being matched at lines A—A;

FIGURE 2 is a plan view of the machine shown in FIGURES 1–A and 1–B, with certain parts, including mainly the upper framework structure, being broken away or removed;

FIGURES 3 is a vertical cross section, taken as indicated by lines 3—3 in FIGURE 1–B, through the bottom conveyor structure and showing particularly the overall master heater assembly;

FIGURE 4 is a vertical section taken as indicated by lines 4—4 in FIGURE 3;

FIGURE 5 is a perspective view of an electrical contact brush which is used with each heated bottom conveyor bar;

FIGURE 6 is a vertical lengthwise section through a side belt heater assembly, taken as indicated by lines 6—6 in FIGURE 2;

FIGURE 7 is a horizontal sectional view through one of the thermal sensing units which ride on the heated side belts, the section being taken as indicated by lines 7—7 in FIGURE 1–A;

FIGURE 8 is a vertical transverse section through a side belt assembly, taken as indicated by lines 8—8 in FIGURE 1–A, and illustrating particularly the thermal sensing unit shown in FIGURE 7;

FIGURE 9 is a wiring diagram of the electrical circuit comprising the temperature controls; and FIGURE 10 is a block diagram schematically illustrating one of the thermostatic controllers.

Referring to the drawings, only so much of a bread wrapping machine is described and shown as is necessary to a complete disclosure of the invention. The structure shown in broken lines toward the left in FIGURE 1–A is entirely conventional and well known in the art, and is fully described in said Patent No. 3,075,326. This application concerns mainly the apparatus effecting the final sealing operations following the draping of a length of wrapping material around the loaf and the formation of end folds and a bottom overlap, the latter operations being effected by the structure shown in broken lines. For a more detailed description of this conventional and well-known structure, reference may be had to said patent and to the patents referred to therein, the following brief description of such structure being merely in the nature of exemplary background material. Loaves of bread are delivered (typically from a bread slicing machine, not shown) by the spaced flights 2 of an intermittently driven endless chain conveyor. By means of a pusher plate 4 each loaf is displaced laterally from the conveyor being moved between spaced heel guide plates, one of which is indicated at 7, and against a web of wrapping material draped over web support plates of which one is indicated at 6. With further forward movement of the pusher plate 4 the loaf is transferred to a lifter table 8 having a yieldable back tension plate 10, the plate 10 being moved rearwardly with the leading end of the wrapper web firmly held between it and the loaf. Concurrently therewith, by means of tucking plates (not shown) at opposite sides of the lifter table 8 the "first fold" is formed at each end of the loaf. Thereafter the pusher plate 4 is withdrawn and the lifter table 8 swings upwardly, thereby draping the wrapping material over the top of the loaf. This upward movement of the lifter table 8 also brings the loaf into engagement with a pair of spaced folder plates 14, each of which forms what is generally known as the "second fold" at one end of the loaf. Upon completion of the upward movement of liffter table 8 a lap roller 12 is moved downwardly by control arms to drape the wrapping material over the other side of the loaf and draw additional wrapping material from the source of supply. The second fold being completed and the lap roller 12 having operated, the loaf is engaged by a set of conveyor flights 18 which move the loaf between a pair of folder plates 16 and 22. Each of the folder plates 16 effects the "third fold" by folding inwardly a flap extending from the leading face of the loaf, and by means of the slot separating each folder plate 16 from the adjoining folder plate 18 the remaining bottom flap is folded upwardly. As a loaf is engaged by the conveyor flights 18 a suitable knife 20 is actuated to shear the wrapper web, during which shearing a break 24 is operative to clamp the wrapper web. The trailing end of the cut length of wrapping material surounding the loaf is guided, by means of a roller 28 and a roller 26 mounted on lifter table 8, into overlapping position beneath the loaf as it is pushed by flights 18 from lifter table 8 over a ribbed bridge plate 30 and a ribbed gap closure plate 32.

The invention concerns primarily the apparatus for heat sealing described hereafter, and it will be understood that the structure which has been described thus far represents only one of the many forms of apparatus which might be employed for prior wrapping. Following their movement across the plates 30 and 32, to complete the bottom overlap, the loaves (L) are moved by conveyor flights 18 onto a bottom conveyor generally designated 40. Conveyor 40 is made up of ordinary crossbars 44 and uniformly spaced heater bars 46 which are connected at their opposite ends to spaced, parallel and endless chains 42. The chains 42 are trained over idler sprockets 48 carried by a shaft 50 and over drive sprockets 51 keyed to a main drive shaft 52 which is driven in synchronism with the main drive (not shown) of the machine through a chain drive 54. Shafts 50 and 52 are journaled in frame side plates 64 which are supported from the main frame F by spacers 66. The lower reaches of chains 42 ride upon and are supported by narrow tracks in the form of bars 68 supported from the side plates 64 by brackets 70. At the upper reaches of chains 42, they ride upon and are supported by upwardly extending track members 72 which are mounted upon spaced cross members 74.

The conveyor crossbars 44 are unheated and hence are ordinary in this and other respects as compared to the bars 46, which are specially constructed electrical resistance heating elements preferably having a plastic coating adapted to prevent adherence to certain wrapping materials such as polyethylene. Such a suitable plastic has been found to be a copolymer of tetrafluoroethylene and hexafluoropropylene ("FEP—fluorocarbon resin") known commercially as "Teflon" (a trademark of E. I. du Pont de Nemours & Co., Wilmington, Delaware). A further characteristic of each heater bar 46 is that its wrapper engaging surface is crowned, as evident particularly in FIGURE 4, whereby heat is applied to the wrapping material along an area of limited width. In the disclosed embodiment of the invention every eleventh bar of the conveyor 40 is a heater bar 46, although it will be understood that other spacings could be adopted. The main consideration is that the conveyor flights 18 and the conveyor 40 are properly synchronized, with their respective spacings (i.e., between pusher flights 18 and heater bars 46) being timed so that each flight 18 brings a loaf into position to rest directly upon one of the heater bars 46. In this respect it will be noted that the distance "d" between the front face of the flight 18 and the center line of a heater bar 46 is determined by the width of a loaf (L) and the desired location of the bottom seal. As disclosed in said copending application, suitable means may be provided for the convenient adjustment of the distance "d."

For the puropse of conducting energizing current to the heater bars 46 there is provided at the one side of the conveyor 40 a brush assembly 76 and at the other side of the conveyor 40 a brush assembly 78. Assemblies 76 and 78 are identical (with the exception of the obvious reversal of parts evident in the drawings) and therefore only the assembly 76 will be specifically described. Within each channel 81 formed in elongate insulating blocks 80 running the length of the conveyor there is embedded a coextensive conductor rail 82 formed of a suitable conductive material such as copper. A conductive shoe or brush 84 associated with each heater bar 46 rides on the rails 82 in sliding contact therewith and is electrically and structurally connected to the heater bar 46 by a screw 83.

Each shoe or brush 84 is characterized by novel and highly advantageous structure, for a description of which reference will be made to FIGURE 5. Whereas in an older type of bread wrapping machine (shown in said copending application) wherein a relatively intricate and complex brush structure was used, the brush 84 is in the form of a simple unitary structure. The actual rail engaging shoe 88 is comprised of a hard, wear-resistant, solid piece of metal, this being brazed or otherwise fused to a substantially U or V-shaped spring 86 which in turn is fused to a rigid right-angular clip or bracket 90 through which the brush is supported from the heater bar 46. Thus, without the use of a separate coil spring or the like, the shoe 88 is resiliently but firmly held in sliding contact with rail 82.

The insulating bars 80 are secured to bars 94 which are mounted on the crossbars 74 through shims 98 and secured thereto by bolts 96. The rails 82 of assemblies 76 and 78 are electrically energized from a power source by means which will be described hereafter in connection with FIGURES 9 and 10.

Referring next to FIGURES 3 and 4, in particular, directly beneath the lower reach of the conveyor 40 there is arranged the master heater bar assembly, generally designated 100, which represents a major aspect of the invention. To a bracket 102 dependent from side plates 64 there is secured a pair of brackets 104, between which there is supported a master heater bar 106 which differs from the traveling heater bars 46 only in that it is not mounted on conveyor chains. The master heater bar 106 has an electrical resistance corresponding as closely as possible to the electrical resistance of the individual traveling heater bars 46. With regard to the power input to the master heater bar 106, this is regulated so that the temperatures of the respective traveling heater bars 46 and the stationary master heater bar 106 are maintained substantially the same, though this aspect of operation is relatively more complex and its description will be treated more fully hereafter. Suffice it to note for the present that the power input to the master heater bar 106 is effected through wire leads 108. To the heater bar 106 there is secured, as by a winding 112, a thermal detector 110 having a lead wire connection 105. In the preferred embodiment of the invention the thermal detector 110 comprises a thermistor. Further more specific aspects pertaining to the type of thermal detector employed and to the operation thereof will be fully described hereafter, though at this point it may be noted that the thermal detector 110 acts to sense the actual temperature of the master heater bar 106 and transmit this electrical intelligence back to the control circuit through lead wire connection 105.

On a shaft 114 which is journalled in bracket 102 there is mounted a rotatable structure resembling a paddle wheel and comprising in the illustrated embodiment a pair of vanes 116 extending tangentially from the shaft 114. As this paddle structure is rotated in a clockwise direction (FIGURE 4) it induces a flow of air across the master heater bar 106 which flow is proportional to the rate at which the shaft 114 is rotated. This rotation of shaft 114 is effected by a chain drive connection 118, 120 and 122 between shaft 114 and the previously mentioned shaft 58, it being recalled that shaft 58 is driven through a chain drive connection to the shaft 52 that is responsible for driving of the conveyor 40, wheeby the shaft 114 is driven at a rate which varies directly with the speed at which conveyor 40 is driven. Hence, the fanning of air across master heater bar 106 by vanes 116 is effected at a rate which is a function of this conveyor speed. The significance of this feature will be more apparent from the overall operational aspects described hereafter.

At opposite sides of the conveyor 40 are traveling heating elements in the form of rear and front side belt assemblies generally designated 123 and 124, respectively. With the exception that side belt assemblies 123 and 124 are face-to-face mirror images of one another, they are identical and therefore only one of them, the front assembly 124, need be described in detail. Referring particularly to FIGURES 3 and 6, the side belt assembly comprises an endless flat wire mesh belt 126 which is coated with "Teflon" or a comparable substance that is incompatible with the thermoplastic wrapping material, and is trained over spaced rollers 128 and 130. Pulley 128 is rotatably mounted by an arm 132 supported from the main frame F in such a manner that a spring device 133 is free to urge the arm 132 in a direction serving to maintain tension of the belt 126. The pulley 130 is rotatably mounted and driven by a gearing unit generally indicated at 136 and which in turn is driven by the previously mentioned shaft 58 by chain drive 138, 140 and 142. Within the side belt assembly 124, a rectangular framework (as viewed in FIGURE 6) is supported from the main frame F by bracket 146, the underside of the framework 148 being covered by a strip of insulating material (e.g. asbestos) held in place by clips 152 (FIGURE 8). The side belt assembly 124 is heated by a pair of specially shaped but otherwise conventional electrical resistance radiant heating elements 154. Each heating element 154 has an oblong oval configuration, as evident in FIGURE 6, and therefore is adapted to radiate heat to a large area of the belt 126. The reduced and threaded terminal ends of heating elements 154 pass upwardly through framework 148 and blocks 156, and over them tubular spacers 158 and crossover bus bars 168 are secured by nuts 162. A protective cover 164 is secured in place by a bolt 163 extending through the cover and through a U-shaped bracket 165 affixed to the framework 148 (FIGURE 3). By means of curved reflectors 167 placed behind each heater the heat is evenly distributed to the belt in order to produce a uniform temperature from the top to the bottom thereof.

A highly significant feature of each side belt assembly is the backing provided for the inner reach of the belt 126 which engages the wrapped loaves L. As evident particularly in FIGURE 3, the sole backing for the belt 126 (other than the pulleys 128 and 130) comprises a rod 169 supported from and extending slightly beyond the framework 148. Rod 169 extends horizontally and at a height approximately midway between the upper and lower edges of belt 126, whereby belt 126 is able to tilt about an axis represented by its point of tangency with the rod. It will be readily evident that this is a highly advantageous feature in that the belt 126 will automatically adjust to the angularity of the bread loaf by tilting about the rod 169, it being understood that quite frequently the end surface of a loaf will represent a plane inclined to the horizontal rather than at a right angle thereto.

On the outer reaches of the side belt assemblies 123 and 124 there are provided thermal-sensing units, 166 and 166', respectively, which ride on the belts and independently function in an electrical circuit to sense the belt temperatures. The thermal-sensing units 166 and 166' are identical, and therefore only the unit 166 which rides on the belt 126 will be described in detail. Referring to FIGURES 7 and 8, unit 166 is suspended in close proximity to the outer reach of belt 126 by a bracket 168. Bracket 168 is fastened in turn to a block 170 having a reduced depending pivot portion 172 on which there is pivotally mounted a yoke 174, the yoke 174 being retained by a sleeve 176 and snap-ring 178.

An insulating block 180 is held in yoke 174 by bolts 172 which have their shanks journalled in bearing sleeves 184 received in the depending arms of the yoke. Block 180 is formed of a material comprising a very dense mixture of asbestos and cement, and commercially known as "Transite" (a trademark of the Johns Manville Company). Thus, by virtue of the pivot portion 172, the block 180 is free to pivot about a vertical axis, and by virtue of the pivots provided by bolts 182 and sleeves 184 the block 180 is free to rotate about a horizontal axis; in other words, the mounting structure for block 180 is in the nature of a gimbal. A frontal cutaway 185 in the block 180 is covered by a shoe 186 adapted to ride on the belt 126 and comprising a piece of polished sheet metal secured to the block 180 by a screw 188. The bracket 168 comprises a piece of spring metal serving to urge the entire unit 166 toward the belt 126, and by virtue of the gimballed mounting discussed above it is ensured that shoe 186 will flatly engage the belt 126 at all times. Secured to the inside of shoe 186, as by special tape, cement or the like (not shown) is a thermistor 190 having lead wires and a plug connection generally indicated at 192. More of these electrical aspects will be treated hereafter. In this structure of the unit 166, in addition to the pivotal mountings of the block 180, a further significant feature is to be noted in that by virtue of the block 180, the thermistor 190 is sensitive only to heat which has excellent insulating properties, transferred from the belt 126 through shoe 186 and radiation or conduction of heat to the thermistor 190 from other sources is prohibited by insulating block 180.

Along the path of travel of wrapped bread loaves, at a location beyond that of side belt assemblies 123 and 124, it is optional to provide labelling apparatus generally designated 194. If such apparatus is installed, as each loaf passes by it the loaf has applied to its ends a label typically having advertising, trademark or pricing material imprinted thereon. Such apparatus is well known and need not be described herein. For present purposes it is sufficient to note that if end labels are applied it generally is desirable to employ traveling heating elements to press these labels against the loaf ends after they leave the labelling apparatus. It may be assumed, therefore, that end labelling apparatus 194 is provided and that the operation of further heat sealing means is desirable. Beyond the side belt assemblies 123 and 124 and the labelling apparatus 194 is a further pair of heated side belt assemblies generally designated 195 and 196. The long side belt assemblies 195 and 196 are essentially identical in structure to the short side belt assemblies 123 and 124 previously described, and therefore a detailed description of the former is deemed unnecessary. The "Teflon"-coated wire mesh belt 198 of assembly 196 corresponds to the shorter belt 126, and is trained on pulleys 200 and 204 similar to pulleys 128 and 130. Pulley 200 is carried by a belt tensioning arm 202 and pulley 204 is supported by frame structure 206. Pulley 204 is rotated by a belt drive 208 driven by a bevel gearing unit generally designated 210 and driven from previously mentioned shaft 58 by chain drive 212 and 134. Belt 198 encloses a pair of electrical resistance radiant heating elements (not shown) similar to heating elements 154 and having their terminal ends mounted in a cover 214. Riding on the belt 198 is a thermal sensing unit 216 which is identical with the unit 166, previously described in detail, with the exception of the independent connection of the unit 216 in the control circuit as described hereafter. Therefore, the thermal sensing unit 216 need not be described in detail. The long side belt assembly 195 embodies the same structure as side belt assembly 196 and has a thermal sensing unit 216' which rides on its belt 198', the unit 216', of course being identical also with the specifically described unit 166.

In the illustrated machine embodying the invention means is provided to bear downwardly on the loaves of wrapped bread as they are moved through the heat sealing apparatus. Specifically, referring to FIGURE 1-B, an under-carriage framework 220 is supported by an upper frame structure 218 by parallel links 219 which maintain the framework 220 in horizontal but vertically adjustable position. Vertical adjustment of the frame 220 is effected by manual operation of a lead screw 222 and fixed nut 223, the screw 222 having its lower end collared in the lower 220. An ordinary canvas belt 224 is trained about pulleys, one of which is shown and indicated at 226, supported from the under-carriage framework 220. Thus the belt 224 exerts by its weight a downward pressure on the loaves, thereby ensuring their contact with the conveyor 40 (and with a belt conveyor 250, mentioned hereafter).

After the wrapped and heated-sealed bread leaves the heated side belt assemblies 195 and 196, it is desired to maintain firm pressure on the end folds while nevertheless discontinuing the application of heat thereto. For this purpose there are provided identical spaced side belts 226 which are trained over pulleys 225 and 227 and supported respectively by framework members 230 and 232, the pulleys 225 being driven from the pulley 204 by a connecting belt drive 228. Plates 234 provide backing for the inner reaches of belts 226.

At this point it should be noted that by suitable means, not shown, each of the side belt assemblies 123, 124, 195, 196, and the belts 226, can have their mutual respective spacings adjusted by suitable means such as shown in Waite Patent No. 2,887,212.

At approximately the location of sprockets 51 the wrapped bread loaves leave the conveyor 40 and are transferred to a conveyor comprising a wide belt 250 which is trained over rollers 238 and 248. Roller 238 is keyed to a shaft 236 which is driven in a clockwise direction (as viewed in FIGURE 1-B) from shaft 52 by chain drive 240. Roller 248 is mounted on a shaft 242 which is journalled in bearings 244 adjustably supported by an arbor 246. The upper reach of belt 250 is supported by a table 252.

Beyond the belts 226, and at the sides of conveyor belt 250, there is provided cooling apparatus generally designated 254. This apparatus, forming no part of the present invention, comprises a pair of spaced side plates 256 and table 258 that are refrigerated by conventional means.

The aspects of temperature control in the side belt assemblies 123, 124, 195 and 196, and in the bottom conveyor 40, may now be brought together by reference to FIGURES 9 and 10. However, by way of review it is noted that it is the main object of the invention to hold constant desired temperatures at belts 126, 126', 198 and 198', and at the conveyor heater bars 46. As mentioned in the introduction hereto, in previously known heat sealing apparatus it was customary merely to set manually a fixed power input to such heating elements, but due to extraneous varying conditions such as ambient temperatures and the variable rate of delivery of bread loaves to the machine the actual temperatures in these heating elements would deviate considerably from their desired temperatures despite this fixed power setting.

In FIGURE 9 five temperature controllers are identified by the Roman numerals I, II, III, IV and V. These controllers are entirely conventional and commercially available and therefore their internal circuitry need not be described. In the preferred embodiment of the invention each comprises a "Fenwal" controller, series 536, manufactured by Fenwal, Incorporated, of Ashland Massachusetts. A block diagram of the principal control circuit involved is given in FIGURE 10. Referring to FIGURE 10, the controller essentially comprises a measuring "Wheatstone Bridge" which receives input intelligence from a "Thermal Detector" and feeds the bridge unbalance into a three-stage "High Gain, Phase Sensitive Amplifier," which in turn operates the "Relay" connected to the equipment to be controlled. In the presently disclosed machine the type of "Thermal Detector" employed in thermal sensing units 166, 166', 216 and 216', and as the detector 110, is a thermistor. A thermistor is a form of bolometer, which is a resistance that changes as a function of temperature. In the thermistor the resistance decreases as temperature rises. The thermistor is to be distinguished from a thermocouple, in which the voltage developed across two dissimilar conductors is proportional to a temperature rise. Nevertheless, it will be understood that within the scope of the invention various thermal detecting means can be employed, including thermistors, thermocouples, and possibly barretters.

Referring to FIGURE 9, in the present case the "Power Supply" (FIGURE 10) is constituted by three-phase, 220 volt power lines 260. The place of each of the controllers, I through V in the circuit of FIGURE 9 is essentially the same for all of the controllers (with exceptions mentioned hereafter in the case of controller III) and therefore only that of controller I will be elaborated. Controller I is tapped into the power supply lines 260 by lines 262 leading to terminals 263 (for the Wheatstone bridge and amplifier). The controller receives its input signal at a pair of terminals 264, and in the case of controller I the lead wires 192 from the thermistor 190 (associated with thermal sensing unit 166) are connected to these terminals 264. The controlling output signal is supplied at a terminal 265, and in the case of controller I this is transmitted through line 266 to a double pole relay generally identified 268. The controller I (and likewise the controllers II through V) is set so that when it receives, at terminals 264, a signal indicating that the temperature sensed is higher than a predetermined temperature it will open the contacts of relay 268, and when it receives a signal indicating a temperature lower than a predetermined temperature it will energize relay 268 to effect the closing of its contacts. Thus, for example, if the thermal sensing unit 166 senses a temperature of belt 126 which is higher than that desired for the heat sealing of a particular wrapping material being used, the controller I will effect the de-energization of relay 268 and the opening of its contacts. (Typical heat sealing temperatures for polypropylene are within the range of 285 to 305° F., and for polyethylene within the range of 245 to 260° F. The heat sealing temperatures of cellophane and wax paper, however, may fall within the wider range of 275 to 350° F.) Associated in the circuit with relay 268 are an overload circuit breaker 269 and an indicator lamp 267 which lights when the relay 268 is energized. The controlled lines 270 from relay 268 lead to the heating elements 154 of the short side belt assembly 124. In summary, therefore, when the temperature of belt 126 as sensed by thermistor 190, and transmitted to controller I through lines 192, is hotter than desired, the controller I will effect the de-energization of relay 268 and interruption of the power supply to heating elements 154 from power lines 260 through lines 270. Similarly, when the temperature of belt 126 is lower than desired the controller I will effect the energization of relay 268 to cut in the power supply from lines 260 to heating elements 154 through lines 270. The basic operation of controllers II, IV and V respectively is exactly the same as that described for controller I.

Controller II receives through lines 272 a signal indicative of the temperature of front long side belt 198 as sensed by the thermistor of thermal sensing unit 216, and its output terminal is connected to a relay 274 which is energized or de-energized to control the power supply to the heating elements of front long side belt assembly 196 through lines 276. Controller IV has its input signal lines 192' connected to the thermistor of the rear short belt assembly 123, and its output is fed to a relay 282 controlling the power supply through lines 284 to the heating elements of assembly 123. Similarly, the controller V has its input terminals connected by lines 272' to the thermistor of thermal sensing unit 216', and its output terminal connected to operate the relay 288, whereby it controls through lines 290 the power supply to the heating elements of the rear long side belt assembly 195.

The hook-up of controller III, for the bottom conveyor 40, is exceptional only in the tap-off for a bucking voltage transformer 292 and the power supply to the master heater bar 106. Whereas the controllers I, II, IV and V are connected to thermal sensing units directly associated with the belts of assemblies 123, 124, 195 and 196 through lead wire connection 105 the controller III is connected to the master heater bar 106 rather than being connected directly to the heater bars of conveyor 40. Thus, the input to controller III is from a stationary heater bar (106) representing (in the nature of a mechanical analog) a travelling heater bar 46, rather than from these heater bars 46 themselves. Nevertheless, the power supply to brush assemblies 76 and 78 through lines 280 is controlled by a relay 278 in direct response to the controller III. Rather complex problems are involved, however, in that the stationary master heater bar 106 ordinarily would not be at the same temperature as the working conveyor heater bars 46 because (a) due to their movement conveyor heater bars 46 suffer greater heat losses (by convection) than the stationary master heater bar 106 and (b) through contact with wrapped bread loaves the conveyor heater bars 46 suffer conductive heat losses to which the master heater bar 106 is not subjected. (The first of these conditions is overcome by the fact that in the master heater assembly 100 the rotating vanes 116 induce a flow of air across the master heater bar 106 that simulates the relative air current experienced by conveyor heater bars 46 in the course of their movement.) As to the second condition (b), this is overcome by provision of the bucking voltage transformer 292 and the relay 294. When relay 294 is de-energized (the condition illustrated in FIGURE 9) the lead-in wires 108 to master heater bar 106 are connected directly in parallel (through line 298) with the lines 280 feeding the brush assemblies 76 and 78 and thereby are at the same voltage. Whether relay 294 is energized is determined by the position of the switch 300 in a relay having its winding 301 connected across the power supply to a slicer or the like 302. It will be understood that numeral 302, in the presently described case, merely represents the means for delivering articles to the machine for wrapping and heat sealing, but for present purposes it may be assumed to be a slicing machine. If the slicing machine is operative, and hence power is supplied thereto through lines 303, loaves of bread are being supplied to the wrapping machine. Under such a condition the conveyor heater bars 46 come in contact with wrapped bread loaves and undergo a resultant heat loss which is not experienced by the master heater bar 106. If, under such conditions, the voltage at the master heater bar 106 is reduced relative to the voltage at each conveyor heater bar 46, there may be achieved (and sensed) a temperature of the master heater bar 106 which is the same as that of each conveyor heater bar 46. To this end, there is employed the bucking voltage transformer 292.

When slicer 302 is operating the switch 300 closes and relay 294 is energized to shunt the power supplied to master heater bar 106 through the bucking transformer 292 via line 296. That is, when relay 294 is energized, master heater bar 106 is connected in series with the secondary of bucking voltage transformer 292. The transformer 292 is designed to reduce by a certain percentage the voltage input to the master heater bar 106 as compared to the line voltage fed to the rails 82 of assemblies 76 and 78 through lines 280. In an actual working embodiment of the invention it has been found that when the voltage to master heater bar 106 is 5% less than the line voltage supplied to the conveyor heater bars 46, during operation of the wrapping machine at a rate of approximately fifty loaves per minute the temperature of the master heater bar 106 will equal the temperature of each travelling heater bar 46. At a rate less than fifty packages per minute this percentage voltage difference is slightly less than 5% and at rates greater than fifty packages per minute this percentage voltage difference is slightly greater than 5%. In this system, therefore, if desired the percentage voltage difference may be varied as a continuous function of the exact rate of delivery. However, for ordinary wrapping rates the voltage differences required to maintain equal temperatures on the master heater bar 106 and conveyor heater bars 46 deviates so slightly from the 5% voltage difference that employment of a bucking voltage transformer 292 having a fixed 5% bucking voltage is quite satisfactory under general wrapping machine operating conditions.

In summation, when the slicing machine 302 is not operating the master heater bar 106 receives the same line voltage as the master heater bars 406, but when the slicing machine 302 is operating the energization of relay 294 effects the operation of bucking voltage transformer 292 to reduce by 5% the voltage to master heater bar 106. What actually happens is that when the voltage to master heater bar 106 is reduced the relay 278 must remain energized for a greater length of time to maintain the master heater bar 106 at a desired temperature, during which time the higher line voltage, and consequently greater power, has been fed to the conveyor heater bars 46. This surplus of power fed to the travelling conveyor heater bars 46 makes up for their heat losses to the wrapped articles, in this case bread loaves, which losses are not experienced by the stationary master heater 106.

The overall operation of the disclosed machine, although inherent in the foregoing detailed description, will now be summarized briefly. As previously stated, the scope of the invention definitely is not limited to the packaging of bread, for in fact the heat sealing apparatus embodying the invention may be employed in conjunction with the packaging of a wide range of numerous other articles. In short, the basic problems and principles of operation explained herein generally will be equally applicable whether the wrapping material contains bakery products or some other type of product, in that in a sense the heat sealing apparatus is "insensible" to the identity of the product contained within the wrapper other than with respect to factors directly involving heat transfer. However, strictly for purposes of description it has been assumed that the product to be wrapped comprises bread.

The bread loaves may be received automatically from a slicing machine, may be delivered manually, or may be supplied by conveyor means leading from any other source. In any case, the loaves are delivered to the wrapping instrumentalities by conveyor flights 2 and are transferred by pusher bar 4 to lifter table 8, in the course of which a web of wrapping material is draped against the leading side of the loaf and the "first" end folds are produced. As the lifter table 8 moves upwardly the "second" end folds are produced by plates 14, and downward movement of lap roller 12 completes the draping of the wrapping material over the top and other side of the loaf. By means of conveyor flights 18 the loaf is moved passed third and fourth folding plates 16 and 22. Concurrently therewith the web is severed by knife 20 and the bottom overlap is completed by rollers 26 and 28. As the draping of the wrapping material about the loaf and the completion of end folds and bottom overlap are now being completed, one of the conveyor flights 18 moves the loaf onto the bottom conveyor 40.

At this point it should be noted that the invention is in no way limited to the formation of the package in the manner just described and that wrapping can be completed by other well-known operations prior to the delivery of packages to the heat sealing apparatus of which conveyor 40 is a part. As previously mentioned the conveyor flights 18 are synchronized with the bottom conveyor 40 so that each loaf is brought to rest with its bottom overlap directly over one of the heated conveyor bars 46, and as the loaf is conveyed thereby this bottom overlap is heat-sealed by the application of moderate heat during an extended rather than a very brief period of time. The electrical power input to the travelling heater bars 46 through the brush assemblies 76 and 78 is periodically cut in and out by operation of the relay 278 acting in response to the controller III, which in turn operates in response to the temperature of master heater bar 106 as sensed by thermistor 110. In order that the master heater bar 106 will be subjected to the same conditions as the travelling heater bars 46, various expedients have been described. First, the master heater bar 106 is in close proximity to the path of travel of heater bars 46. Secondly, the fanning means comprising vanes 116, which are rotated at a speed proportional to the speed of conveyor 40, induces a flow of air over the master heater bar 106 to simulate the convection losses experienced by the travelling heater bars 46. Thirdly, during operation of the means effecting delivery of articles to the heat sealing apparatus, such means being in the presently illustrated case a slicing machine (302), through closure of switch 300 the relay 294 is energized to cut in a bucking voltage transformer 292. This transformer reduces by a certain percentage the input voltage to the master heater bar 106 as compared to the line voltage to the travelling heater bars 46, whereby for reasons explained the relay 278 remains energized for longer periods of time and consequently the power input to the conveyor heater bars 46 is slightly increased. The net result of the latter expedient is that compensation is made for the fact that the master heater bar 106 is not subjected to heat losses directly to wrapped articles as in the case of the travelling heater bars 46. Thus it is insured that the temperature sensed at the master heater bar 106 will be the same as the actual temperature of each travelling heater bar 46. When the means effecting the delivery of articles to the heat sealing apparatus is interrupted, then relay 294 is de-energized and the voltage input to conveyor heater bars 46 and master heater bar 106, through lines 280 and 108 respectively, then becomes equal. The over-heating of the heater bars 46 is thereby prevented. This same result, however, can be accomplished in several other ways, including, for example, a system wherein the voltage to the master heater bar 106 remains constant and the voltage to the conveyor heater bars 46 is increased during the delivery of articles and reduced to that of the master heater bar when the machine is being run idle.

The overall master heater assembly 100 with its associated controls, shown in FIGURES 9 and 10, represents a system which in a physical and mathematical sense may be termed a "simulation" or "mechanical analog" of the travelling heater bars 46 and the conditions to which they are subjected. (These terms are commonly understood as defining a system wherein a set of variables is represented by physical means.)

During their travel on conveyor 40 the wrapped loaves have their end folds heat-sealed by engagement with the short side belts 126, which are heated from their inner sides by the lightweight radiant heating elements (e.g. 154). As the belt of each side belt assembly, e.g. the belt 126 of assembly 124, is engaged by an end of the loaf it is permitted to tilt about the rod 169, which provides its sole backing and thereby conforms to the angular disposition of this particular loaf end. As a result, uniform contact between the belt and a large area at an end of the loaf is ensured.

The power inputs to side belt assemblies 123 and 124 are controlled individually by relays 268 and 282, respectively, operating in response to controllers I and IV, which in turn are responsive to the belt temperatures sensed by thermal sensing units 166 and 166'. By virtue of the gimballed mounting of each insulating block 180 its shoe 186 rides flatly on the associated heated belt. Also, the enclosed thermistor (190 in the case of unit 166) is shielded from the outside thermal effects by the insulating block. As the controllers I and IV sense temperature changes in the side belt assemblies 123 and 124 they respond quickly to effect any necessary changes in the power fed thereto.

The electrical resistance radiant heating elements (FIGURE 6) are of light weight and therefore are able to respond quickly to these controls in contrast to prior types of heating assemblies wherein large heat-conducting masses are involved.

If desired, labels may be applied to the ends of the wrapped loaf by apparatus indicated generally at 194. The wrapped loaves then enter between the heated side belt assemblies 195 and 196. The basic operation of these assemblies is identical with that of side belt assemblies 123 and 124 and need not, therefore, be unduly elaborated. By means of the thermal sensing units 216 and 216' and the controllers II and V to which they are coupled, the power input to the heating included in these assemblies is controlled through relays 274 and 288 to maintain the belts 198 and 198' at exactly the selected temperature. During this portion of the heat sealing light pressure is exerted downwardly on the loaves by the lower reach of belt 224. Upon leaving the long side belt assemblies 195 and 196 the loaves are transferred onto the conveyor belt 250 and concurrently therewith the pressure on the end folds is maintained by side belts 226. Finally, the loaves proceed through the cooling apparatus 254.

Although the heat sealing apparatus has been described in its application to articles wrapped with a bottom overlap and end folds, it should be understood that aspects of the invention are equally applicable to other types of packages as, for example, a "bottom fold" type of package in which the folds are overlapped across the bottom of the package.

Also, various other departures from the specifically disclosed embodiments of the invention can be effected without departing from the scope thereof as defined by the following claims.

What is claimed is:

1. In heat sealing apparatus, an endless conveyor for carrying articles to be heat sealed and having incorporated in the conveyor a plurality of electrical heating elements, an electrical heating element stationarily mounted but otherwise identical to one of said travelling heating elements, a source of electric power, means providing a regulated supply of power from said source to both said stationary and travelling heating elements, and means responsive to the temperature of said stationary heating element for controlling the last-mentioned means.

2. In heat sealing apparatus, a travelling electrical heating element, means presenting a succession of wrapped articles to said heating element for engagement and movement therewith, a stationary electrical heating element having physical and electrical properties similar to said travelling heating element, means sensing the temperature of said stationary heating element, a source of electric power, and a control system responsive to said sensing means for controlling the power input from said source to both said stationary and travelling heating elements, thereby to maintain the actual heat sealing temperature of said travelling heating element substantially constant at a desired temperature.

3. In heat sealing apparatus, a travelling heating element, means presenting a succession of wrapped articles to said heating element for engagement and movement therewith, a stationary system constituting a mechanical analog of said conveyor heating element and including means simulating the conditions to which said travelling element is subjected, and means responsive to said system for maintaining the actual heat sealing temperature of said element substantially constant at a desired temperature.

4. In heat sealing apparatus, a travelling electrical heating element, means presenting a succession of wrapped articles to said heating element for engagement and movement therewith, a source of electric power, means establishing an analog system simulating the heat losses occurring in said travelling heating element and producing output signals indicative of the temperature of said travelling heating element, and means responsive to said signals for regulating the power input from said source to said heating element to maintain a substantially constant heat sealing temperature thereof.

5. In heat sealing apparatus, a conveyor for moving wrapped articles to be heat sealed and having incorporated therein a plurality of heating elements spaced in the direction of conveyor travel, a heating element stationarily mounted but otherwise identical to one of said travelling heating elements, an electric power source, means sensing the actual temperature of said stationary heating element, and control means responsive to said sensing means for effecting a regulated supply of power from said source to both said stationary and travelling heating elements to maintain the actual heat sealing temperature thereof at a substantially constant desired temperature.

6. The invention according to claim 5, including means inducing a flow of air across said stationary heating element in proportion to the rate of movement of said conveyor.

7. The invention according to claim 5, including means directing across said stationary heating element a flow of air approximating the relative flow of air across said travelling heating elements due to their motion.

8. The invention according to claim 5, including a movable vane adapted to direct a flow of air across said stationary heating element, and means driving said vane at a rate proportional to the rate of movement of said conveyor.

9. In heat sealing apparatus, an endless conveyor having incorporated therein a plurality of elongate and electrically heated bars spaced in the direction of conveyor travel, an electrically heated elongate bar mounted stationarily but otherwise being identical to one of the first-mentioned bars, a vane extending parallel to and substantially coextensive with the length of said stationary bar, means driving said vane transversely relative to said stationary bar at a speed having a fixed relation to the rate of movement of said conveyor, thereby to direct a cooling flow of air across the stationary bar, an electric power source, means sensing the temperature of said stationary bar, and control means responsive to said sensing means for effecting a regulated supply of power from said source to both said stationary and said first-mentioned electrically heated bars to maintain the same at a substantially constant desired heat sealing temperature.

10. The invention according to claim 9, wherein said stationarily mounted bar is mounted in close proximity to the path of travel of said first-mentioned bars forming a part of the conveyor.

11. The invention according to claim 9, wherein said vane is constructed to direct air across said stationary bar at a rate comparable to the relative air flow experienced by the first-mentioned bars in the course of their movement.

12. The invention according to claim 9, including means delivering wrapped articles to said conveyor for engagement and movement therewith, and wherein said control means include means responsive to operation of said delivering means to effect a slightly greater individual power input to said electrically heated bars incorporated in said conveyor.

13. In heat sealing apparatus, an endless conveyor having incorporated therein a plurality of electrical heating elements, means delivering to said conveyor a succession of wrapped articles for engagement and movement therewith, an electrical heating element stationarily mounted but otherwise identical to one of the first-mentioned heating elements, a source of electric power, means sensing the temperature of said stationary element, and a control circuit responsive to said sensing means for effecting a regulated connection of said source to both said first-mentioned and stationary heating elements to maintain the same at a substantially fixed desired heat sealing temperature, said control means including means responsive to the delivery of articles to the conveyor to effect a power input to said first-mentioned elements which is greater than the power input to said stationary element by an amount directly related to the rate of said delivery.

14. In heat sealing apparatus, an endless conveyor having incorporated therein a plurality of electrical heating elements, means delivering to said conveyor a succession of wrapped articles for engagement and movement therewith, an electrical heating element stationarily mounted but otherwise identical to one of the first-mentioned heating elements, a source of electric power, means sensing the temperature of said stationary element, and a control circuit responsive to said sensing means for effecting a regulated connection of said source to both said first-mentioned and stationary heating elements to maintain the same at a substantially fixed desired heat sealing temperature, said control means including means responsive to the delivery or non-delivery of articles to said conveyor to supply the same power input to said first-mentioned and stationary elements during non-delivery of articles and a slightly greater power input to each of said first-mentioned elements than to said stationary element during the delivery of articles.

15. In heat sealing apparatus, an endless conveyor having incorporated therein a plurality of electrical heating elements, means delivering to said conveyor a succession of wrapped articles for engagement and movement therewith, an electrical heating element stationarily mounted but otherwise substantially identical to one of the first-mentioned elements, a source of electric power, means sensing the temperature of said stationary element, and a control circuit including means responsive to said sensing means to effect connection and disconnection between said power source and said stationary and first-mentioned elements to maintain a substantially fixed desired heat sealing temperature, said control circuit further including means responsive to the rate of delivery of articles by said delivery means for supplying a power input to each of said first-mentioned elements greater than to said stationary element by a difference directly related to said rate of delivery.

16. In heat sealing apparatus, a flat travelling belt, means presenting wrapped articles to said belt at one side thereof, means heating said belt, and a convex member engaging and extending lengthwise along a major portion of the other side of said belt, and providing the sole backing for the belt along said major portion.

17. In heat sealing apparatus, an endless, flat and relatively wide heat-conducting belt, means mounting said belt for movement thereof through a path of travel wherein the belt defines an outer planar heat sealing surface, means for driving said belt, means located at the inside of said belt and spaced from the inner surface thereof for heating of the belt, means presenting to said belt for engagement and movement with said planar surface thereof a succession of wrapped articles, and a stationary backing device in engagement with the inner surface of said belt at the location of said defined planar outer surface and providing the sole backing for a major portion of the length thereof, said device comprising: an elongate member engaging the belt intermediate its side edges and extending lengthwise of the belt, whereby the belt is permitted to shift about the axis defined by said member and thereby adjust automatically to the configuration of said wrapped articles.

18. In heat sealing apparatus, an endless conveyor having incorporated therein a plurality of spaced electrical heating elements, a pair of electrically conducting brushes mounted on said element, a pair of stationary rails adjacent the path of travel of said brushes, and a source of electric power connected to said rails; each of said brushes comprising a metallic shoe slideably engageable with and riding upon one of said rails, and a simple, flat, substantially U-shaped metallic spring integral with said shoe and serving to mount the same on its associated heating element and thereby resiliently urging the shoe against said one rail.

19. In heat sealing apparatus, an endless conveyor having incorporated therein a plurality of electrical heating elements, means delivering to said conveyor a succession of wrapped articles for engagement and movement therewith, a source of electric power, and control means effecting a regulated connection of said source to said heating elements, said control means including means responsive to the rate of delivery of articles to the conveyor to effect automatically a greater power input to said heating elements during the delivery of articles than during the non-delivery of articles, thereby to prevent overheating of the heating elements during such non-delivery.

20. In heat sealing apparatus, a travelling heat sealing element in the form of a flat endless belt, means for heating said belt, means for mounting and driving said belt, means presenting to said belt a succession of wrapped articles for engagement and movement with the surface thereof, a stationary thermal sensing unit engageable with said belt, means for heating said belt, and means responsive to said unit for controlling said heating means to maintain the belt at a substantially constant desired heat sealing temperature, said sensing unit comprising: a temperature-responsive electrical element coupled to said responsive controlling unit, a flat, thin metallic shoe riding on said belt and having the last-mentioned element attached to the inside thereof, an insulative block connected to said shoe and enclosing said last-mentioned element to shield the same, and gimballed means mounting said shoe and block for automatic angular adjustments about intersecting axes parallel to the belt surface, thereby causing said shoe to ride flatly on said belt.

21. In heat sealing apparatus, a travelling heat sealing element in the form of a flat and relatively wide heat conducting belt, means for mounting and driving said belt, at least one electrical resistance type radiant heating element of relatively light mass located at the inside of said belt and spaced from the inner surface thereof, separate means also located at the inside of said belt providing the inner backing along the heat sealing surface thereof, an electric power source, and control means connecting said source to said heating element and including means automatically regulating the power input to said heating element to maintain said belt at a substantially constant desired heat sealing temperature.

22. In heat sealing apparatus, a travelling heat sealing element in the form of a flat and relatively wide heat conducting belt, means for mounting and driving said belt, at least one electrical resistance type radiant heating element of relatively light mass located at the inside of said belt and spaced from the inner side of the heat sealing surface thereof, an element interposed between said heating element and said inner surface of the belt and providing backing for the belt, said element extending in alignment with the belt between its side edges, said belt being shiftable about an axis provided by the last-mentioned element to conform to the contour of wrapped articles, an electric power source, and control means connecting said source to said heating element and including means automatically regulating the power input to said heating element to maintain said belt at a substantially constant desired heat sealing temperature.

References Cited in the file of this patent

UNITED STATES PATENTS

| | | |
|---|---|---|
| 1,888,098 | Swaney | Nov. 15, 1933 |
| 2,065,835 | Taylor | Dec. 29, 1936 |
| 2,530,973 | Kirsch et al. | Nov. 21, 1950 |
| 2,780,414 | De Heer | Feb. 5, 1957 |
| 3,040,156 | McGlaughlin | June 19, 1962 |
| 3,064,403 | Tokos et al. | Nov. 20, 1962 |
| 3,075,326 | Waite | Jan. 29, 1963 |

FOREIGN PATENTS

| | | |
|---|---|---|
| 114,269 | Australia | Dec. 4, 1941 |
| 888,469 | France | Dec. 14, 1943 |